UNITED STATES PATENT OFFICE.

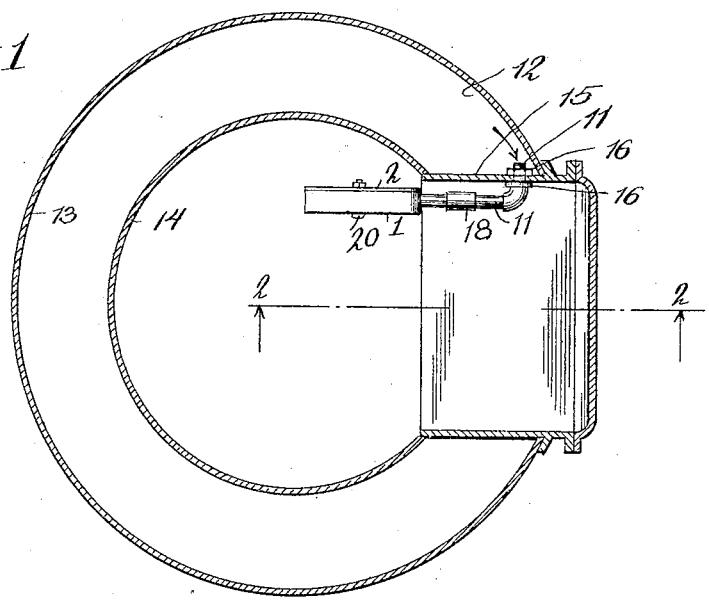
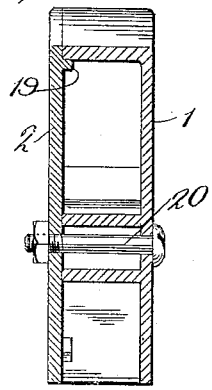
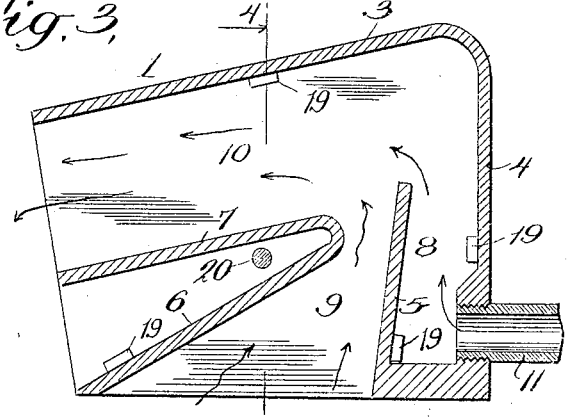
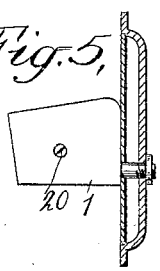
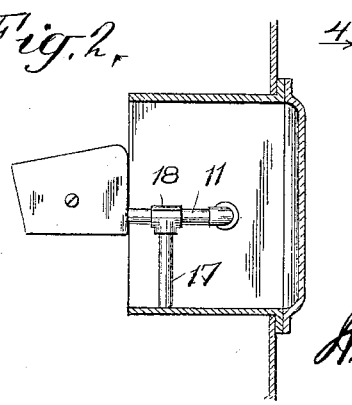

WILBUR F. HERRICK, OF HAWORTH, NEW JERSEY, ASSIGNOR TO HERRICK COMPLETE COMBUSTION COMPANY, OF NEW YORK, N. Y., A CORPORATION OF MAINE.

APPARATUS FOR PROMOTING COMBUSTION.

No. 805,462.       Specification of Letters Patent.       Patented Nov. 28, 1905.

Application filed February 25, 1905. Serial No. 247,265.

*To all whom it may concern:*

Be it known that I, WILBUR F. HERRICK, a citizen of the United States of America, and a resident of Haworth, county of Bergen, State of New Jersey, have invented certain new and useful Improvements in Apparatus for Promoting Combustion, of which the following is a specification, reference being had to the accompanying drawings, forming a part thereof.

My invention relates to improvements in apparatus for promoting combustion, and particularly to means for introducing atmospheric air into the combustion-chamber of a furnace, stove, heater, or the like for the purpose of mixing same with the hot products of combustion.

My device consists of an article of manufacture especially arranged to be applied to existing combustion-chambers of water-heaters, steam-heaters, air-heaters, stoves, &c., and comprises certain novel details of construction and combination of parts, as will be hereinafter more fully pointed out. It is well understood that when the ash-pit and furnace doors are closed there is always a suction in the combustion-chamber. I employ this suction for the purpose of drawing in air to promote combustion; but in order that air thus introduced may be employed to the best advantage it is necessary to raise its temperature to a high degree. Carbon monoxid or the products of imperfect combustion require that air shall be at a high degree of temperature before the oxygen thereof is available for combination therewith to produce carbon dioxid. In the formation of carbon dioxid more than three times the number of heat units are liberated than in the formation of carbon monoxid, and hence the conversion of all the carbon monoxid to carbon dioxid is desirable. In my device I draw in the air by means of the suction above mentioned and mingle the air with the products of combustion from the furnace. The commingling of air and heated gases will raise the temperature of the air to a sufficient degree to render its oxygen available, so that the carbon monoxid or products of imperfect combustion will combine with the oxygen of the air to produce carbon dioxid. I then return the mixed gases to the combustion-chamber, where they will be entirely consumed, and utilize the excess of air carried over into the combustion-chamber to supply oxygen to the carbon monoxid therein.

My invention also consists in introducing the air to the apparatus in a preheated state, so as to further increase the efficiency of the device, and for this purpose I preferably connect the air-inlet of the apparatus with a portion of the heater or the like in which there is heated air. For instance, in air-heaters I connect the device with the hot-air chamber.

I will now proceed to describe an apparatus embodying my invention, with reference to the accompanying drawings, and will then point out the novel features in claims.

In the drawings, Figure 1 shows a view in horizontal section through an air-heater having my device connected thereto, the said device showing in top view. Fig. 2 is a view in central vertical section through a portion of the heater, showing my device in side elevation, the plane of section being substantially upon the line 2 2 of Fig. 1. Fig. 3 is a view in central longitudinal section through the combustion device. Fig. 4 is a view in vertical transverse section therethrough, the plane of section being substantially upon the line 4 4 of Fig. 3. Fig. 5 is a detail view showing the device as connected to the door of a furnace, heater, or the like.

The device itself comprises a shell composed of two members 1 and 2, the member 1 forming the body portion of the device and the member 2 a cover-plate. The member 1 has top and rear walls 3 and 4 and partition-walls 5, 6, and 7. These walls divide the member 1 into three chambers—an air-admission chamber 8, a gas-admission chamber 9, and a mixing and delivery chamber 10. Air is admitted into the air-admission chamber 8 by means of a pipe 11, connected therewith, and air rushing in through this pipe and through the air-admission chamber 8 tends to draw gases up through the gas-admission chamber 9, the air and gas being mixed together in the chamber 10 and finally delivered therefrom.

The device is intended to be arranged in the combustion-chamber of a furnace of any character. In Figs. 1 and 2 it is shown as arranged in the combustion-chamber of an air-heater, while in Fig. 5 it is shown as merely secured to a door, which door may constitute a portion of a water-heater, steam-heater, boiler, stove, or any other apparatus in which combustion is to be promoted. The inrushing air will then draw the products of imperfect combustion up through the gas-admission chamber 9, and mingling therewith will be heated to a sufficient extent to impart their oxygen for the purpose of converting the carbon monoxid to carbon dioxid, as above set forth. To admit preheated air to the tube 11 will of course increase the efficiency of the device, and I therefore preferably connect the same with a space containing preheated air. In Figs. 1 and 2 the pipe is shown as connected with the hot-air chamber 12 of an air-heater, 13 designating the outer shell or casing and 14 the wall of the fire-pot. The pipe 11 enters the chamber 12 through the wall 15 of the firing-tunnel, suitable lock-nuts 16 being provided for securing the device in position. For convenience of supporting the device a branch pipe 17 connects with the pipe 11 by means of a T 18. The end of the supporting-pipe 17 is closed, as it is intended only for the purpose of support and not for the purpose of admitting air, the air being admitted through the pipe 9 from the chamber 12. It will be seen that an apparatus of this description may be quickly and easily applied to the combustion-chamber of an air-heater or the like without having to draw the fire and by drilling but a single hole through the tunnel-wall for the purpose of connecting it. Again, the device may be easily and quickly attached to any door, as shown in Fig. 5, being secured in position by a single lock-nut, and this also may be done while the heater is in use.

As a matter of construction the cover-plate or member 2 is provided with several projecting lips or lugs 19, which engage the walls of the member 1, whereby the said members are centered with respect to each other, and a single bolt and nut 20, passing through the two said members, secures them positively in position. Such construction is an extremely simple and inexpensive one, and a device so constructed is capable of practically universal application. Further, by manipulation of this single bolt and removal of the cover-plate the entire interior of the device is exposed, so that the various chambers therein may be readily cleaned, &c., and the device may be cleaned in position, because the supporting means in no way interferes with the removal of the cover-plate, as stated.

What I claim is—

1. As an article of manufacture, a device for promoting combustion comprising an injecting device having gas-admission, air-admission, and mixing chambers, the device composed of a body portion having laterally-projecting walls constituting the walls of the said chambers, and a removable cover-plate therefor, whereby, when the cover-plate is removed, the entire interior is exposed, together with means for securing the cover-plate in position, and means for supporting the device in a combustion-chamber.

2. As an article of manufacture, a device for promoting combustion comprising an injecting device having gas-admission, air-admission, and mixing chambers, the device composed of a body portion having laterally-projecting walls constituting the walls of said chambers, a removable cover-plate therefor, whereby, when the cover-plate is removed, the entire interior is exposed, the cover-plate provided with lugs engaging the walls of the body portion, a bolt for securing the cover-plate in position, and means for securing the device in a combustion-chamber, said means connecting with the air-admission chamber and constituting means for admitting air thereto.

3. As an article of manufacture, a device for promoting combustion comprising an injecting device having gas-admission, air-admission, and mixing chambers, the device composed of a body portion having laterally-projecting walls constituting the walls of the said chambers, and a removable cover-plate therefor, whereby, when the cover-plate is removed, the entire interior is exposed, together with means for securing the cover-plate in position, and means for supporting the device in a combustion-chamber, said means comprising a pipe fitted to the air-admission chamber of the device and arranged to admit air thereto.

4. As an article of manufacture, a device for promoting combustion comprising an injecting device having gas-admission, air-admission, and mixing chambers, the device composed of a body portion having laterally-projecting walls constituting the walls of the said chambers, and a removable cover-plate therefor, whereby, when the cover-plate is removed, the entire interior is exposed, together with means for securing the cover-plate in position, and means for supporting the device in a combustion-chamber, said means comprising a pipe fitted to one of the said walls of the body portion, and opening therethrough into the air-admission chamber, said pipe arranged to admit air to the said chamber.

5. The combination with an air-heater containing a combustion-chamber and a hot-air chamber substantially surrounding same and having a firing-tunnel bridging across the hot-air chamber into the combustion-chamber, of a device for promoting combustion arranged within the combustion-chamber, said device comprising injecting means having an air-inlet, an inlet for the products of combustion, a mixing-chamber for the gases, and a discharge arranged to deliver the mixed gases to the combustion-chamber, and a pipe secured to a wall of the firing-tunnel and to the said device at its air-inlet, said pipe affording communication between the said hot-air chamber and the said air-inlet, and also forming a support for said device as a whole.

6. The combination with an air-heater containing a combustion-chamber and a hot-air chamber, and having a firing-tunnel bridging across the hot-air chamber into the combustion-chamber, of a device for promoting combustion arranged within the combustion-chamber, said device comprising injecting means having an air-chamber 8, an inlet 9 for products of combustion from the furnace, and a mixing-chamber 10 opening into the combustion-chamber, a pipe 11 secured at one end to a wall 15 of the firing-tunnel, and at the other end to the device, said pipe affording communication between the hot-air chamber of the furnace and the air-chamber 8 of the injecting means, and a supporting branch 17 secured to the said pipe 11.

WILBUR F. HERRICK.

Witnesses:
D. HOWARD HAYWOOD,
LYMAN S. ANDREWS, Jr.